(12) United States Patent
Kosaka et al.

(10) Patent No.: US 6,236,962 B1
(45) Date of Patent: May 22, 2001

(54) SPEECH PROCESSING APPARATUS AND METHOD AND COMPUTER READABLE MEDIUM ENCODED WITH A PROGRAM FOR RECOGNIZING INPUT SPEECH BY PERFORMING SEARCHES BASED ON A NORMALIZED CURRENT FEATURE PARAMETER

(75) Inventors: Tetsuo Kosaka, Zama; Yasuhiro Komori, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/038,898

(22) Filed: Mar. 12, 1998

(30) Foreign Application Priority Data

Mar. 13, 1997 (JP) ...................................... 9-059161

(51) Int. Cl.$^7$ .................................................. G10L 15/20

(52) U.S. Cl. ........................................................... 704/234

(58) Field of Search .................................... 704/224, 226, 704/228, 233, 243, 234

(56) References Cited

U.S. PATENT DOCUMENTS

| | | | |
|---|---|---|---|
| 4,227,046 | * 10/1980 | Nakajima et al. | 704/234 |
| 5,208,863 | 5/1993 | Sakurai et al. | |
| 5,220,629 | 6/1993 | Kosaka et al. | |
| 5,369,728 | 11/1994 | Kosaka et al. | |
| 5,515,475 | * 5/1996 | Gupta et al. | 704/242 |
| 5,583,961 | 12/1996 | Pawlewski et al. | |
| 5,598,505 | 1/1997 | Austin et al. | |
| 5,604,839 | * 2/1997 | Acero et al. | 704/234 |
| 5,621,849 | 4/1997 | Sakurai et al. | |
| 5,787,396 | 7/1998 | Komori et al. | |
| 5,797,116 | 8/1998 | Yamada et al. | |
| 5,812,975 | 9/1998 | Komori et al. | |

OTHER PUBLICATIONS

Chien et al "Noisy speech recognition using variance adapted likelihood measure" 1996 IEEE 45–48.*
Openshaw et al "On the limitations of cepstral features in noise" 1994 IEEE II–49–II–52.*
Acero et al "Robust speech recognition by normalization of the acoustic space" 1991 IEEE 893–896.*
Matsui, T., et al., "N–Best–Based Instantaneous Speaker Adaptation Method for Speech Recognition", Proceedings ICSLP 96, Fourth International Conference on Spoken Language Processing, Philadelphia, PA, Oct. 3–6 1996, vol. 2, pp. 973–976.
R. Schwartz, et al., "A Comparison of Several Approximate Algorithms for Finding Multiple (N–BEST) Sentence Hypotheses", ICASSP 91, vol. 1, May 1991, Toronto, Ontario, Canada, S10.4, pp. 701–704.

(List continued on next page.)

Primary Examiner—Richemond Dorvil
Assistant Examiner—Harold Zintel
(74) Attorney, Agent, or Firm—Fitzpatrick, Cella, Harper & Scinto

(57) ABSTRACT

An apparatus, method, and storage medium for eliminating the influence of line characteristics in a real-time manner in order to raise recognition precision of input speech and to enable the speech to be recognized in a real-time manner, includes a device and step for obtaining, an estimate value of a long-time mean of a parameter from speech feature parameters which are sequentially inputted by using the speech feature parameters which have already been inputted, and a device and step for normalizing the speech feature parameter inputted at that time point by using the obtained estimate value. Each time the speech feature parameter is inputted, the latest estimate value is obtained by using the already inputted parameters including the inputted speech feature parameter, and the latest input speech feature parameter is normalized by using the updated estimate value. Since the reliability of the estimate value is higher as the number of speech feature parameters used when the estimate value is obtained is larger, the estimate value is normalized by adding a weight in accordance with the reliability.

27 Claims, 6 Drawing Sheets

OTHER PUBLICATIONS

F.K. Soong, et al., "A Tree–Trellis Based Fast Search for Finding the N Best Sentence Hypotheses in Continuous Speech Recognition", ICASSP 91, vol. 1, May 1991, Toronto, Ontario, Canada, S10.5, pp. 705–708.

M. Rahim, et al. "Signal Bias Removal for Robust Telephone Based Speech Recognition in Adverse Environments", ICASSP–94, vol. 1, Apr. 1994, Adelaide, South Australia, pp. I–445–I–448.

* cited by examiner

SPEECH PROCESSING APPARATUS AND METHOD AND COMPUTER READABLE MEDIUM ENCODED WITH A PROGRAM FOR RECOGNIZING INPUT SPEECH BY PERFORMING SEARCHES BASED ON A NORMALIZED CURRENT FEATURE PARAMETER

BACKGROUND OF THE INVENTION

1. Field of the Invention

The invention relates to a technique for performing speech recognition by using a feature of a speech time series, such as a cepstrum or the like.

The invention also relates to a technique for the removal of convolution distortion, such as line characteristics or the like.

The invention further relates to a technique for enabling an instantaneous or successive adaptation to noise.

2. Related Background Art

In the case of performing speech recognition in a real environment, problems can be caused by convolution distortion due to a distortion of line characteristics due to the influence of a microphone, telephone line characteristics, or the like and an additive noise such as an internal noise or the like. As a method of coping with the distortion of the line characteristics, among them, a Cepstrum Mean Subtraction (CMS) method has been proposed. The CMS method has been disclosed in detail in Rahim, et al., "Signal Bias Removal for Robust Telephone Based Speech Recognition in Adverse Environments", Proc. of ICASSP'94, 1994 or the like.

The CMS method is a method of compensating for the distortion of the line characteristics. According to such a method, on the basis of information extracted from input speech, the line distortion is corrected on the input time series side or the model side, such as HMM or the like, thereby making it adaptive to the input environment. Thus, even if the line characteristics fluctuate, it is possible to flexibly cope with such a situation.

The CMS method is a method of compensating for convolution distortion (line distortion) which acts due to a convolution of an impulse response. A long-time spectrum of input speech is subtracted from the input speech and a long-time spectrum of a speech used in the model formation is subtracted from a model, thereby normalizing a difference of the line characteristics. The normalizing process is generally performed in a logarithm spectrum region or a cepstrum region. Since the for convolution distortion appears as an additive distortion in those two regions, the for convolution distortion can be compensated for by a subtraction. A method of performing such a process in the cepstrum region is called a CMS method.

By using the CMS method as mentioned above, it is possible to cope with the distortion of the line characteristics due to the influence of the microphone, telephone line characteristics, or the like. In the case of using the CMS method, however, in order to compute a cepstrum long-time mean (CM) from the speech inputted as a recognition target, the user has to wait for completion of the input of speech as a recognition target. The recognizing process is performed after the CM was obtained, namely, after the end of the speech input. Therefore, a recognition algorithm cannot be made operative synchronously with the speech input. It is, consequently, impossible to perform a real-time process according to the conventional method.

SUMMARY OF THE INVENTION

According to the invention, since a distortion of line characteristics which can fluctuate can be compensated for at a high speed in a semi-real-time manner, speech recognition can be performed in a real-time manner with high precision after a normalization of the line characteristics was performed.

DETAILED DESCRIPTION OF THE PREFERRED EMBODIMENT

An embodiment according to the invention will now be described in detail hereinbelow with reference to the drawings.

Figure 3:
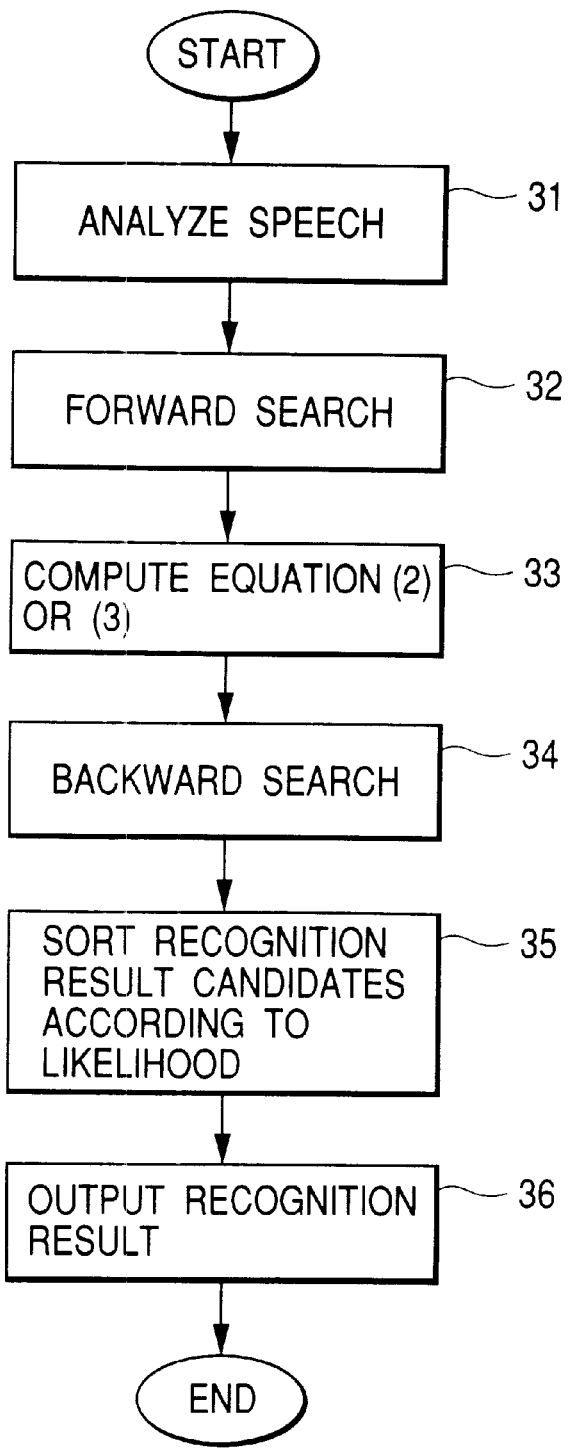
FIG. 3 is a flowchart for a speech recognizing method using a CM computing method at the time of a backward search using a multipath search.
Figure 6:
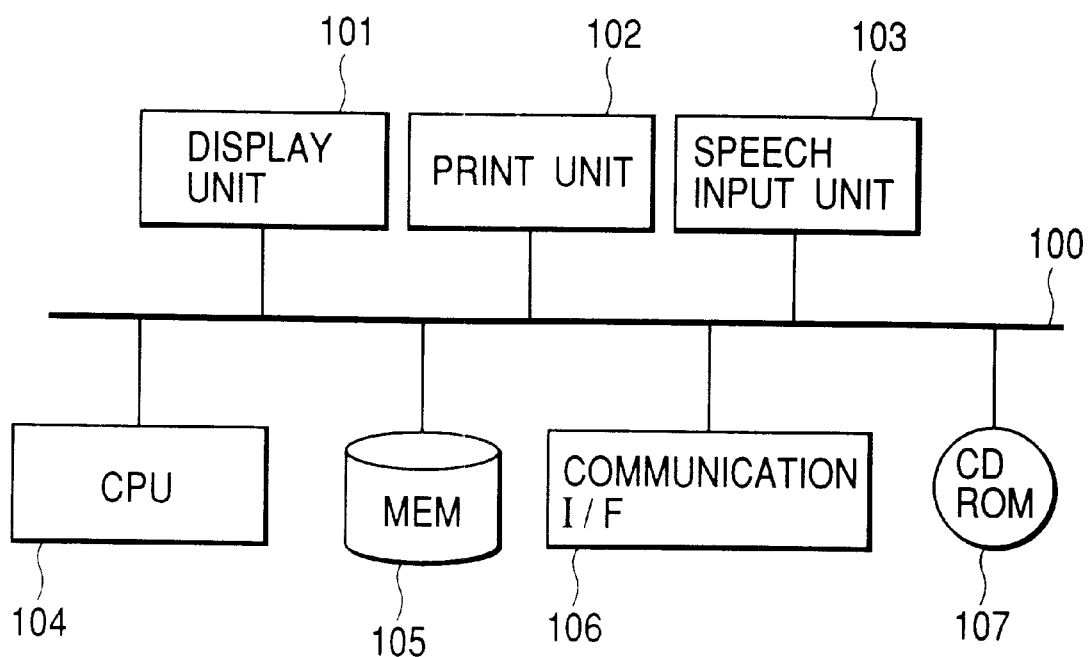
FIG. 6 is a block constructional diagram of the apparatus according to the invention.

FIG. 6 is a block diagram showing the construction of a speech recognizing apparatus according to the invention. Reference numeral 101 denotes a display unit such as CRT, a liquid crystal display, or the like for displaying a character train obtained as a result of speech recognition; and 102 indicates a print unit such as an LBP, an ink jet printer, or the like for printing the character train obtained as a result of the speech recognition. The character train which is outputted from the display unit 101 or print unit 102 is a train of character fonts corresponding to candidate character codes of recognition results. Reference numeral 103 denotes a speech input unit)such as a microphone or the like. A speech can be also inputted via communicating means such as a public line, a LAN, or the like as a speech input unit 103. Reference numeral 104 denotes a CPU for controlling the apparatus so as to execute various processes, which will be explained hereinlater, in accordance with control programs stored in a memory unit 105 or a detachable storing medium 107, such as a CD-ROM or the like. Although the CPU 104 controls the execution of various applications in addition to processes, which will be explained hereinlater, the CPU 104 also controls the apparatus (for example, "print", "end", and the like) so as to execute various processes regarding the applications in accordance with a command corresponding to the speech recognized by the method of the invention. Reference numeral 105 denotes the memory unit provided in the apparatus. The memory unit 105 stores control programs for various processes which are executed by the CPU 104 and will be explained hereinlater, various parameters (for example, data corresponding to a dictionary which is used for the speech recognition, and the like) which are necessary for the control programs, speech data to be recognized, and the like. The control programs and various parameters which are stored in the memory unit 105 can be inputted from the storing medium 107 or can be also inputted and stored through a communication line. Reference numeral 106 denotes a communication I/F for controlling communication so as to transmit and receive data through communicating means such as a public line, a LAN, or the like. It is also possible to construct the apparatus in a manner such that speech inputted by another apparatus or control programs and various parameters stored in the other apparatuses are fetched into the apparatus via the communication I/F 106 and are stored into the memory unit 105, and after that, each process which will be explained hereinlater is started. Reference numeral 107 denotes the storing medium such as a CD-Rom, an FD, or the like, which can be attached and detached to/from the apparatus main body, namely, the storing medium which can store the control programs, various parameters, and speech data which have already been described as being stored in the memory unit 105 and can be attached and detached to/from the apparatus main body. The data can be down-loaded from the storing medium 107 to the memory unit 105 before starting various processes, which will be explained hereinlater, or the CPU 104 can also directly access to the storing medium 107. FIG. 3 is a memory map of the data stored in the memory unit 105 or storing medium 107. Control programs for various processes as shown at 401 to 403 have been stored in the memory map. Although not shown in FIG. 3, a parameter storing portion, a speech data storing portion, a working area, and the like besides them are also provided.

Figure 1:
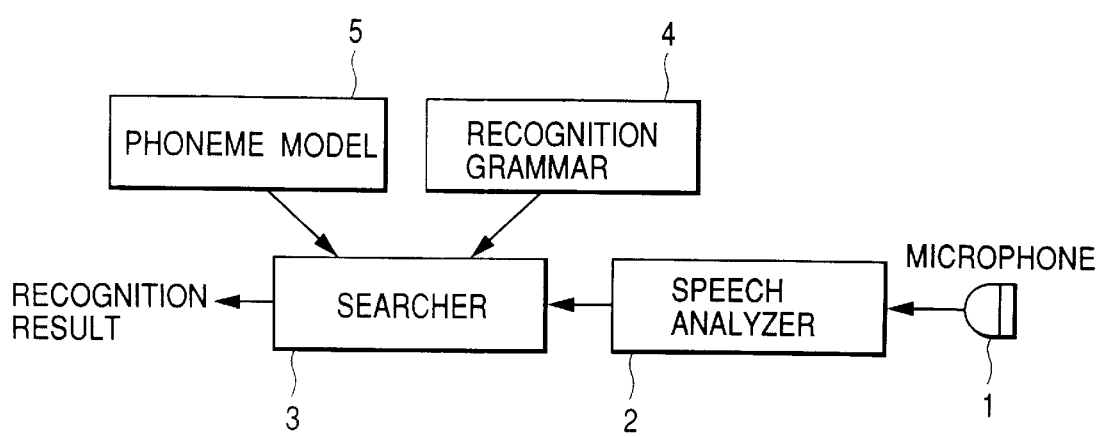
FIG. 1 is a functional block constructional diagram of an apparatus according to the invention.

FIG. 1 is a functional block constructional diagram of a speech recognizing apparatus of the embodiment according to the invention. In the diagram, reference numeral 1 denotes a microphone for inputting speech. The microphone 1 is realized by the speech input unit 103. Reference numeral 2 denotes a speech analyzer for converting the inputted speech to a feature parameter time series; 3 denotes searcher for searching for a correct recognition series by using information of feature parameters, grammar, and phoneme models. The speech analyzer 2 and searcher 3 are realized by the CPU 104 in FIG. 6. Reference numeral 4 denotes a recognition grammar and 5 indicates a phoneme model for speech recognition. The recognition grammar 4 and phoneme model 5 for speech recognition use the data stored in the memory unit 105 or storing medium 107.

First, 1) a computation of a cepstrum long-time mean (CM) by a weighting process of an input length will now be described.

This method is a method of updating an estimate (U value of the CM each time speech of one frame is inputted and subtracting the latest estimate value of the CM from the latest speech frame. However, since the number of speech frames that are used for the computation of the estimate value of the CM is small just after the start of the speech, its value includes many errors, so that there is a fear of deterioration of recognizing performance. To prevent such a drawback, a weight according to the number of frames used in the computation of the CM estimate value, namely, the number of input frames at that time point is added to the CM. When the number of input frames is small, the weight to be added is reduced, thereby decreasing the amount of CM which is subtracted. In contrast, when the number of input frames rises, the weight is increased, thereby enlarging an amount of CM which is subtracted. The weight is increased or decreased in a range of 0 to 1 in accordance with the number of frames (input time length).

The speech analyzer 2 performs a general cepstrum analysis of the speech inputted from the microphone 1. A normalization of a parameter $x_n$ of the n-th frame in one input speech which was cut-out after the analysis is executed by the following equation (1), thereby obtaining a normalized parameter $(x_n)'$ of the n-th frame.

$$(x_n)' = x_n + \mu_d - \frac{n}{n+\tau} \cdot \frac{1}{n} \sum_{k=1}^{n} x_k \quad (1)$$

where, $\mu_d$: CM of a database $\tau$: constant

The weight $n/(n+\tau)$ by the frame number of the second term is not limited to the above equation but can be also substituted by a function in which a value is set to a value within a range from 0 to 1 with an increase in n. The parameter $(x_n)'$ obtained by normalizing as mentioned above is recognized as a feature parameter.

Subsequently, 2) a subtracting process of the CM using the multipath search will now be described.

The multipath method is a method of narrowing correct-answer candidates by repeating the search a plurality of times (at least twice). In first search, the search is performed while computing the CM of the input speech. In the first search, the CM of the input speech is not reflected by the speech recognition. At the time of the second search, the CM obtained from the whole input speech in which the speech input has already been completed and the computation has been finished is subtracted from the input speech cepstrum, thereby removing the convolution distortion noise as a fluctuation in line characteristics.

The multipath search is used in the searcher 3 in FIG. 1. There is a Tree-trellis based search or a Forward-backward search as a method of recognizing by the multipath search. The Tree-trellis based search has been disclosed in detail in the literature by F. K. Soong and E. F. Huang, "A Tree-Trellis Based Fast Search for Finding the N Best Sentence Hypoteses in Continuous Speech Recognition", Proc. of ICASSP91, pp.705 to 708, May, 1991. The Forward-backward search has been described in detail in the literature by S. Austin, R. Schwartz, and P. Placeway, "The Forward-Backward Search Algorithm", Proc. of ICASSP91, pp. 697 to 700, May, 1991. Although an example using the Tree-trellis based search will be described in the embodiment, the searching method of a searcher 3 is not limited to such an example. The Tree-trellis based search method is an algorithm for realizing a strict N-best search and is constructed by searches of two stages of the forward search and the backward search. In the forward search (the first search), a Viterbi search, synchronized with a frame, is performed and an upper predetermined number of results, among the results obtained by the forward search, are selected as recognition-result candidates of the input speech. In the backward search, (the second search), an A* search in which the results of the forward search are heuristic, is performed with respect to each of the selected candidates.

In the searches of two stages, the CM of the whole input speech is computed in parallel with the search at the time of the forward search and the resultant CM is subtracted and the searching process is executed at the time of the backward search, thereby normalizing the line characteristics. The normalization at the time of the backward search is executed by either one of the following equations (2) and (3).

$$(x_n)' = x_n + \mu_d - \frac{N}{N+\tau} \cdot \frac{1}{N} \sum_{k=1}^{N} x_k \quad \text{or} \tag{2}$$

$$(x_n)' = x_n + \mu_d - \frac{1}{N} \sum_{k=1}^{N} x_k \tag{3}$$

where, N: frame length of the input speech

According to the equation (2), since the amount of CM which is subtracted is reduced particularly in the case where the frame length of the input speech is short, errors of the CM, which occur because of the short input time length, can be reduced and it is effective to improve recognizing performance.

By changing the normalizing method of the input speech in accordance with the forward search and the backward search as mentioned above, although the conditions of the A* search are not satisfied, by sufficiently enlarging a stack of N-best and sorting the recognition-result candidates in accordance with the likelihood, a sufficient precision can be maintained.

Further, the methods of 1) and 2) are combined, in the forward search, the search is performed by the method of 1) while executing the normalization by the CM obtained by the weighting process of the input length and, in the backward search, the normalization is executed by the method of 2).

Figure 2:
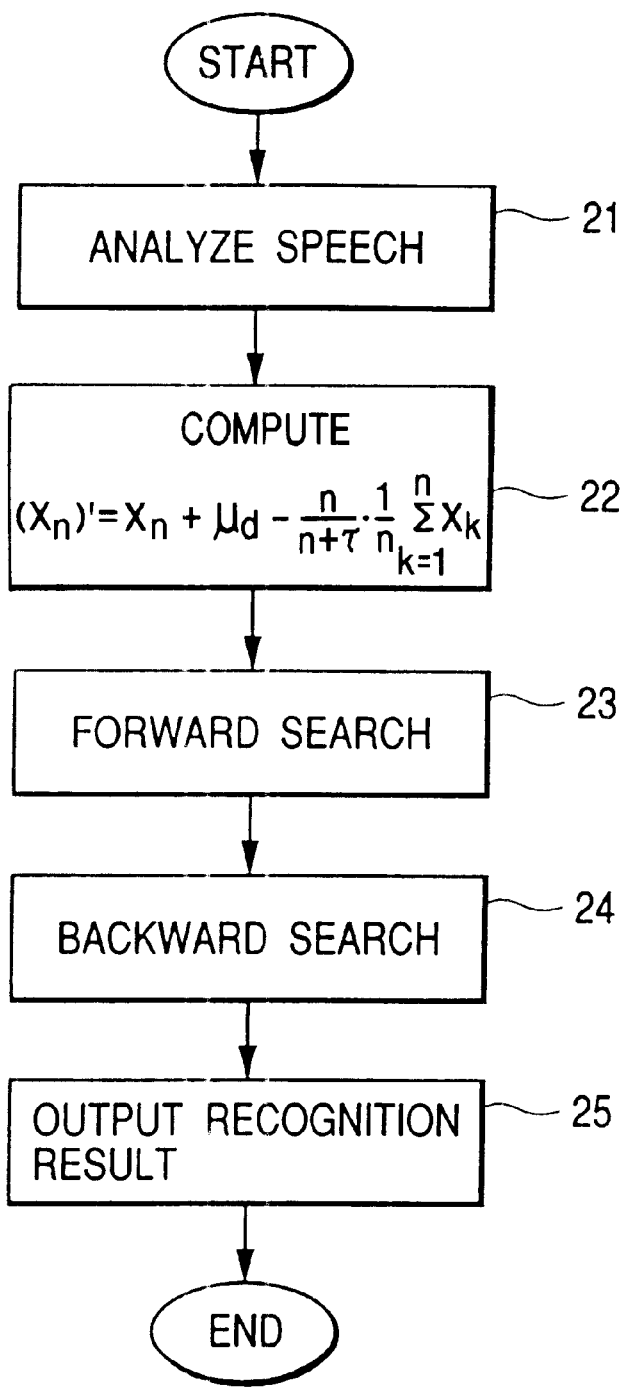
FIG. 2 is a flowchart for a speech recognizing method using a computing method of CM by a weighting process of an input length.
Figure 4:
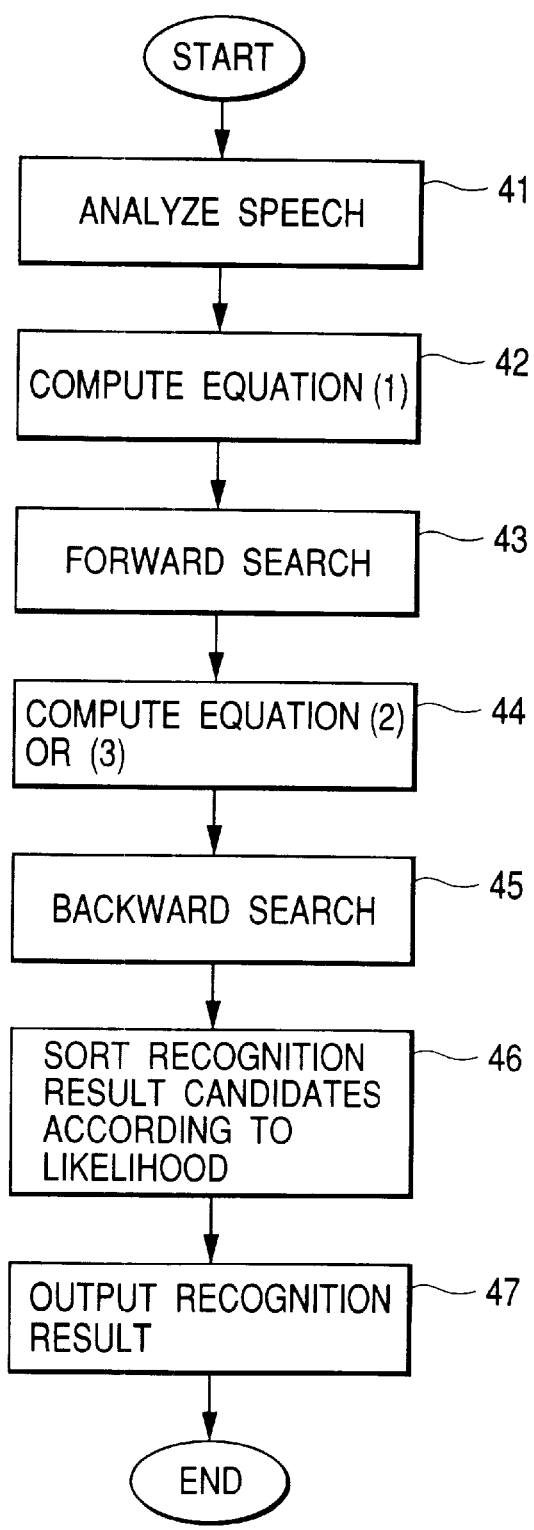
FIG. 4 is a flowchart for a speech recognizing method which uses the CM computing method by the weighting process of the input length at the time of a forward search and, further, performs a re-computation of a CM at the time of the backward search.

A flow of the computation mentioned above is shown in flowcharts of FIGS. 2 to 4. FIG. 2 is the flowchart for a speech recognizing method using the computing method of the CM by the weighting process of the input length of 1). The input parameter is normalized (22) by the equation (1) before the forward search (23). At the time of the backward search, a logarithm likelihood of each parameter calculated at the time of the forward search (24) is used as it is and added. FIG. 3 is the flowchart for a speech recognizing method using the CM computing method at the time of the backward search using the multipath search in 2). According to this method, at the time of the forward search (32), the search using the cepstrum parameter, by the ordinary speech analysis which is not normalized, is performed. After completion of the speech input (33), each candidate selected by the forward search is subjected to the normalization of the input parameter by the equation (2) or (3), thereby searching (34). Thus, the likelihood at the time of the forward search and that at the time of the backward search are different and the A* condition is not satisfied. Therefore, the recognition result candidates are sorted in accordance with the likelihood (35) and the result is outputted (36). FIG. 4 relates to the combination method of 1) and 2). At the time of the forward search (43), the search is performed (42) by using the parameter normalized by the equation (1). At the time of the backward search (45), the search is executed by using the parameter (44) normalized by the equation (2) or (3). In this case as well, since the likelihoods in the forward search and the backward search are obviously different, the recognition result candidates are sorted in accordance with the likelihood (46) and the recognition result is outputted (47). The above processes are executed for every speech input.

The embodiment has been described above with respect to the example of normalizing the line characteristics for every speech input. However, when it is discriminated that there is no fluctuation of the line characteristics, by normalizing the line characteristics with respect to a plurality of speech inputs, a more stable normalization of the line characteristics can be performed. In the above description, each time the input speech changes, the value of n in the equation (1) or the value of N in the equations (2) and (3) is cleared. However, in the method of performing the normalization for a plurality of input speeches, such a value is not cleared every time but the value is held for a plurality of speech inputs and the normalization is executed.

Although the embodiment has been described above with respect to the example of presuming the cepstrum as a parameter, a logarithm spectrum can be also used in place of the cepstrum.

Figure 5:
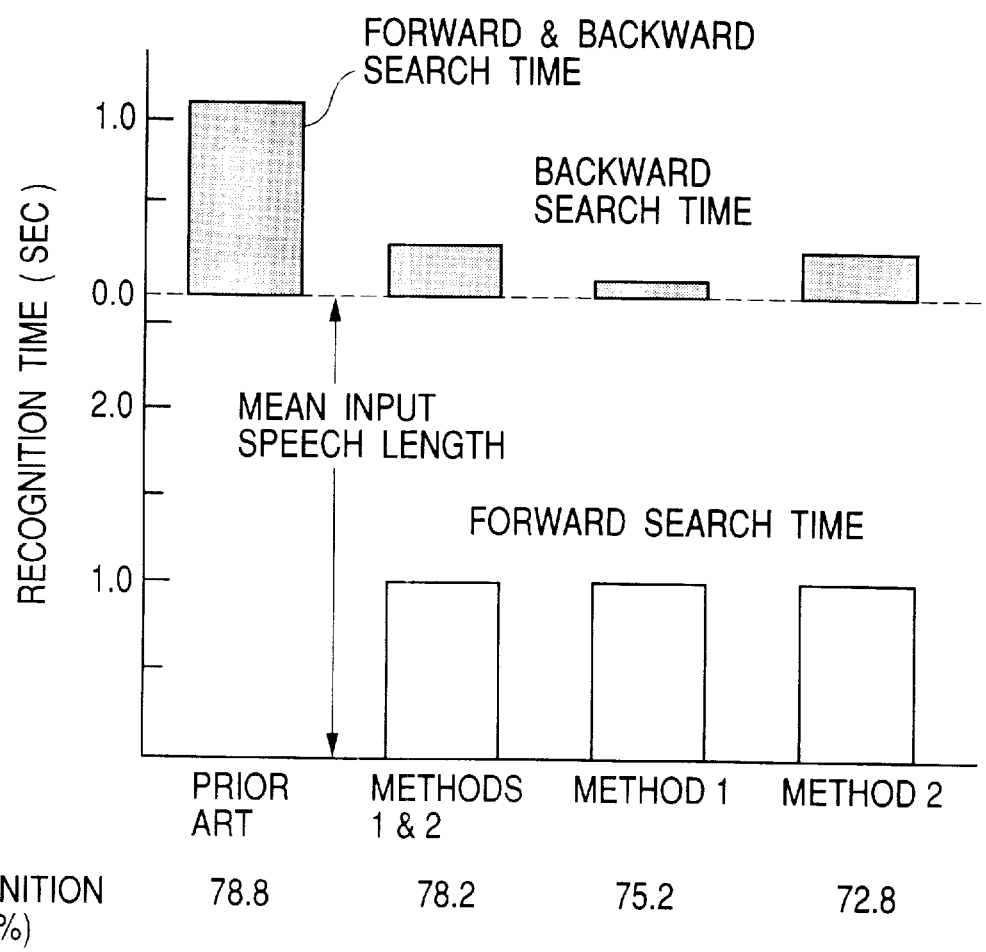
FIG. 5 is a comparison diagram of a recognition processing time of each method.

FIG. 5 is a diagram showing an effect of the invention and shows a recognition processing time of each method.

Experimental conditions are as follows. First, an evaluation is made by an unspecified-speaker sentence recognition. The number of words is set to 1004. The word is perplexity 30.2. The analyzing conditions are set to a sampling rate of 8 kHz, a frame period of 10 msec, a window width of 25.6 msec, and a preemphasis of 0.97. As for the feature amounts, an LPC melcepstrum of 12-th degree, a ALPC melcepstrum of 12-th degree, and a Δ logarithm power are used. In the speech recognition, an HMM of 3 states and 6 mixture is used in a recognition system in which the HMM is used as a base and 243 kinds of right-environment dependency phonemes HMM are used in a diagonalization covariance matrix. Recognition targets are 50 sentences uttered by ten speakers. By transmitting the speeches through a band pass filter of 300 to 3200 Hz, a distortion of line characteristics are given. According to the conventional method, the normalizing process can be performed only at a time point when the speech utterance is finished, so that it takes 1 sec or more as a recognizing time after the end of the utterance. On the other hand, according to the invention, in any case, the recognition is finished for a time interval from about 0.05 sec to about 0.26 sec after the end of the utterance. A numerical value shown in the lower portion of the diagram indicates a recognition rate of each method in case of adjusting τ. For comparison, a recognition rate in case of not performing the normalization of the line characteristics is equal to 65.0%. According to the combination method of 1)+2), it will be understood that the reduction in recognition rate is very small and a computation amount can be remarkably reduced. According to the method as mentioned above, by processing the normalization of the distortion of the line characteristics synchronously with the speech input, the line characteristics can be normalized at a high speed.

What is claimed is:

1. A speech processing method comprising the steps of:
   inputting speech;
   generating a current feature parameter from a current frame of the inputted speech;
   computing a current mean value using prior feature parameters generated from prior frames of the inputted speech;
   weighting the generated current mean value in accordance with the number of the prior feature parameters;
   normalizing the current feature parameter using the weighted current means value; and
   performing a first search based on the normalized feature parameters and a second search based on a result of the first search in order to recognize the inputted speech.

2. A method according to claim 1, wherein the feature parameters are parameters in a cepstrum region.

3. A method according to claim 1, wherein the feature parameters are parameters in a logarithm spectrum region.

4. A method according to claim 1, wherein the weight of the generated current means value is increased as the number of the prior feature parameters is increased.

5. A method according to claim 1, wherein the performing step performs the second search based on feature parameters normalized by a mean value of the feature parameters generated from the frames of the inputted speech.

6. A method according to claim 1, further comprising a step of outputting characters corresponding to the recognized speech to a display.

7. A method according to claim 1, further comprising a step of outputting characters corresponding to the recognized speech to a printer.

8. A method according to claim 1, wherein the inputting step inputs the speech from a microphone.

9. A method according to claim 1, wherein the inputting step inputs the speech from a communication line.

10. A speech processing apparatus comprising:

input means for inputting speech;

computing means for generating current feature parameter from a current frame of the inputted speech and computing a current means value using prior feature parameters generated from prior frames of the inputted speech;

normalizing means for weighting the generated current mean value in accordance with the number of the prior feature parameters and normalizing the current feature parameter using the weighted current means value; and recognizing means for performing a first search based on the normalized feature parameters and a second search based on a result of the first search in order to recognize the inputted speech 11. An apparatus according to claim 10, wherein the feature parameters are parameters in a cepstrum region.

12. An apparatus according to claim 10, wherein the feature parameters are parameters in a logarithm spectrum region.

13. An apparatus according to claim 10, wherein the weight of the generated current mean value is increased as the number of the prior feature parameters is increased.

14. An apparatus according to claim 10, wherein the recognizing means performs the second search based on feature parameters normalized by a mean value of the feature parameters generated from the frames of the inputted speech.

15. An apparatus according to claim 10, further comprising output means for outputting characters corresponding to the recognized speech to a display.

16. An apparatus according to claim 10, further comprising output means for outputting characters corresponding to the recognized speech to a printer.

17. An apparatus according to claim 10, wherein the input means inputs the speech from a microphone.

18. An apparatus according claim 10, wherein the input means inputs the speech from a communication line.

19. A computer-readable medium stores a program, the program performing the steps of:

inputting speech;

generating a current feature parameter from a current frame of the inputted speech;

computing a current mean value using prior feature parameters generated from prior frames of the inputted speech;

weighting the generated current mean value in accordance with the number of the prior feature parameters;

normalizing the current feature parameter using the weighted current means value; and performing a first search based on the normalized feature parameters and a second search based on a result of the first search in order to recognize the inputted speech.

20. A medium according to claim 19, wherein the feature parameters are parameters in a cepstrum region.

21. A medium according to claim 19, wherein the feature parameters are parameters in a logarithm spectrum region.

22. A medium according to claim 19, wherein the weight of the generated current means value is increased as the number of the prior feature parameters is increased.

23. A medium according to claim 19, wherein the performing step performs the second search based on feature parameters normalized by a mean value of the feature parameters generated from the frames of the inputted speech.

24. A medium according to claim 19, further comprising a step of outputting characters corresponding to the recognized speech to a display.

25. A medium according to claim 19, further comprising a step of outputting characters corresponding to the recognized speech to a printer.

26. A medium according to claim 19, wherein the inputting step inputs the speech from a microphone.

27. A medium according to claim 19, wherein the inputting step inputs the speech from a communication line.

* * * * *

UNITED STATES PATENT AND TRADEMARK OFFICE
CERTIFICATE OF CORRECTION

PATENT NO.    : 6,236,962 B1
DATED         : May 22, 2001
INVENTOR(S)   : Tetsuo Kosaka et al.

It is certified that error appears in the above-identified patent and that said Letters Patent is hereby corrected as shown below:

Column 1,
Lines 50 and 51, "for" should be deleted.

Column 2,
Line 46, "unit)such" should read -- unit such --.

Column 3,
Line 14, "CD-Rom," should read -- CD-ROM, --.
Line 20, "down-loaded" should read -- downloaded --.
Line 36, "a denotes" should read -- denotes a --.
Line 49, "(U" should be deleted.

Column 4,
Line 32, "noise" should be deleted.
Line 40, "Hypoteses" should read -- Hypotheses --.

Column 5,
Line 9, "speech" should read -- speech. --.

Column 6,
Line 27, "are" should read -- is --.

Column 7,
Line 29, "speech" should read -- speech. --.

Signed and Sealed this

Twentieth Day of May, 2003

JAMES E. ROGAN
*Director of the United States Patent and Trademark Office*